(12) United States Patent
Evanson

(10) Patent No.: US 8,048,184 B1
(45) Date of Patent: Nov. 1, 2011

(54) BAFFLE TOOL

(76) Inventor: Gary D. Evanson, Hillman, MN (US)

( * ) Notice: Subject to any disclaimer, the term of this patent is extended or adjusted under 35 U.S.C. 154(b) by 0 days.

(21) Appl. No.: 12/854,873

(22) Filed: Aug. 11, 2010

Related U.S. Application Data

(60) Provisional application No. 61/233,477, filed on Aug. 12, 2009.

(51) Int. Cl.
B01D 45/08 (2006.01)

(52) U.S. Cl. .............. 55/465; 55/434; 55/440; 55/442; 55/443; 55/444; 55/445; 55/462; 55/DIG. 5; 55/DIG. 35; 55/DIG. 36; 95/267

(58) Field of Classification Search .............. 55/DIG. 5, 55/434, 440, 442–446, 462, 465, DIG. 35, 55/DIG. 36; 95/267
See application file for complete search history.

(56) References Cited

U.S. PATENT DOCUMENTS

| | | | |
|---|---|---|---|
| 64,285 A | 4/1867 | Collins | |
| 127,212 A | 5/1872 | Aylworth | |
| 1,431,861 A * | 10/1922 | Adams | 414/449 |
| 2,217,319 A * | 10/1940 | Poole et al. | 294/99.2 |
| D152,478 S * | 1/1949 | Hutchinson et al. | D22/150 |
| 3,120,847 A | 2/1964 | Cavaness | |
| 4,019,769 A | 4/1977 | Filion | |
| 4,962,957 A * | 10/1990 | Traber | 294/19.1 |
| 5,014,578 A * | 5/1991 | Flentge | 81/367 |
| 5,354,110 A * | 10/1994 | Licata | 294/11 |
| 5,513,889 A | 5/1996 | Fithen et al. | |
| 5,575,518 A | 11/1996 | Payne | |
| 6,477,758 B2 | 11/2002 | Krebel | |
| 6,507,987 B1 | 1/2003 | Price | |
| 7,465,332 B2 | 12/2008 | Randinelli | |
| 2006/0125166 A1* | 6/2006 | Gerritsen et al. | 269/6 |
| 2007/0035144 A1* | 2/2007 | Buzby et al. | 294/137 |
| 2007/0245703 A1 | 10/2007 | Randinelli | |

* cited by examiner

Primary Examiner — Jason M Greene
Assistant Examiner — Dung H Bui
(74) Attorney, Agent, or Firm — Albert W. Watkins

(57) ABSTRACT

A baffle tool operative to manually install and remove commercial grill baffles and filters has a longitudinally extensive handle. First and second filter plates pivotally attach to the handle and are operative to couple through a set of prongs with a commercial grill filter. An actuating handle is moveable relative to the longitudinally extensive handle. First and second linking rods extend between the filter plates and actuating handle, and transmit motion of the actuating handle to the first and second filter plates. Movement of the actuating handle thereby causes the filter plates to move relative to the longitudinally extensive handle. A lock is also provided for selectively locking the actuating handle to the longitudinally extensive handle and preventing motion therebetween, which facilitates the securement of a baffle to the tool.

13 Claims, 7 Drawing Sheets

BAFFLE TOOL

CROSS REFERENCE TO RELATED APPLICATIONS

This application claims priority to U.S. provisional patent application Ser. No. 61/233,477 filed Aug. 12, 2009 and naming the present inventor, the entire contents which are incorporated herein by reference.

BACKGROUND OF THE INVENTION

1. Field of the Invention

This invention pertains generally to handling, including hand and hoist-line implements, and more particularly to a grapple with pivoted jaws and crossed levers; an expanding and pivoted grapple; and to pole mounted implements. One exemplary embodiment of the invention is a grill filter baffle removal tool that facilitates hand removal of filter baffles from grill or other restaurant hoods.

2. Description of the Related Art

At most establishments that serve food, such as a restaurant, diner, bar, or the like, a grill will be found. The grill is a large heated cook surface, usually smooth, typically flat, and often fabricated from stainless or other ferrous alloy. Such grills most commonly have overhead vents to clear the air surrounding the cooking space. Many of these vents will simply draw the air from above the grill and pass it through a pipe or conduit to the outdoors, exterior of the building. In addition to grills, similar vents are found above various deep-frying and other cooking appliances.

As grease and other food matter is heated and boils or evaporates, this grease and other matter is entrained into the air stream that is drawn into the vent. As the hot grease is entrained in surrounding air, the grease cools. With enough cooler air drawn in and mixed therewith, the grease and food matter condenses from the air stream onto adjacent surfaces, which without other precautions would be onto the vent pipe or conduit. Unfortunately, such an accumulation of grease presents a fire and health safety hazard that is unacceptable.

To prevent this undesirable accumulation of grease, filters have been devised that keep the vent pipes and conduits from becoming coated in grease. These filters provide a surface upon which the grease will selectively condense, and more elaborate filters even include grease drains to remove and collect the grease in a safe collector.

Due to health and safety concerns and codes, grease filters need to be cleaned or replaced periodically. However, such filters are often out of reach and not easily replaced or cleaned. At the end of the work day, employees attempting to remove the filter have been known to stand on the grill surface to reach the filter, leaving the grill unsanitary and, in some situations, leaving melted rubber from the soles of the shoes on the grill. Ladders are not ideal to reach the filters either, due to the obstruction caused by the vent hood and grill. Consequently, filter removal tools are highly desired. However, removal tools of the prior art have typically been unstable and difficult to handle. The net result has been damage to expensive filters.

An exemplary prior art filter tool is illustrated in U.S. Pat. No. 5,513,889 by Fithen et al, entitled "Filter Tongs," the contents and teachings which are incorporated herein by reference. This patent describes a single pair of tongs that spread apart to grapple the filter. The mechanism that controls the spread is a scissors-like handle that is manually grasped, with one hand on each moveable member of the scissors. While this invention by Fithen et al advances the state of filter removal, there remain several limitations, drawbacks or deficiencies that will desirably be overcome. One drawback is the risk of pinching in the hand region, and adjacent the scissors pivot. Further, the use of a single pair of tongs in some filter designs presents undesirable opportunity for the filter to spin or rotate relative to the tongs. Finally, this invention does not incorporate a locking mechanism, and so requires careful holding and handling to avoid unintentional release of a filter from the tongs.

Other filter tool patents, the contents and teachings which are incorporated by reference herein, include 4,019,769 by Filion, entitled "Screen Gripper"; 6,477,758 by Krebel, entitled "Grease Filter Remover"; 6,507,987 by Price, entitled "Grease Filter Remover for Restaurant Hoods"; and 7,465,332 by Randinelli, entitled "Disposable Grease Filter for Air Filtration System and Method of Manufacturing Same". Unfortunately, these patents fail to remedy the deficiencies of Fithen et al described herein above.

Other patents disclosing grabbing devices with various locking members, the contents and teachings which are incorporated by reference herein, include U.S. Pat. No. 64,285 by Collins, entitled "Leak Stopper"; U.S. Pat. No. 127,212 by Aylworth, entitled "Improvement in Stalk Holders"; 3,120,847 by Cavaness, entitled "Surgical Needle Holder"; 5,014,578 by Flentge, entitled "Pipe Tongs"; 5,575,518 by Payne, entitled "Gripper Tool for Handling Lumber"; and Des 152,478 by Hutchinson et al., entitled "Fish Mouth Opener or Similar Article". Additionally, a lever action grabber without locking member, the contents and teachings which are incorporated by reference herein, is shown in 5,354,110 by Licata, entitled "Fireplace Tongs".

In addition to the aforementioned patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a baffle tool that permits a baffle, such as may be used to filter an airstream passing through a hood, to be safely and reliably manually removed and installed by a person who may remain standing on the floor. The baffle tool has a longitudinally extensive handle and a pair of filter plates, each filter plate pivotal with respect to each other and to the handle. Filter-engaging prongs protrude from the filter plates distal to the handle. An actuator is moveable with respect to the handle, and a means is provided linking the actuator to the filter plates such that movement of the actuator effects pivotal movement of the filter plates relative to the handle.

In a second manifestation, the invention is, in combination, a filter suitable for use with a grill and a longitudinally extensive and transversely collapsible filter baffle tool operatively engaging therewith. The filter has a plurality of baffles separated by empty spaces therebetween; and a frame retaining the baffles at distal ends. The longitudinally extensive and transversely collapsible filter baffle tool has a longitudinally extensive handle and a pair of filter plates, each filter plate pivotal with respect to each other and to the handle. Filter-engaging prongs protrude from the filter plates distal to the handle. An actuator is moveable with respect to the handle, and a means is provided linking the actuator to the filter plates such that movement of the actuator effects pivotal movement of the filter plates relative to the handle.

In a third manifestation, the invention is a commercial grill filter installation and removal tool that comprises a longitudinally extensive handle, first and second filter plates pivotally attached to the handle and operative to couple with the commercial grill filter; an actuating handle moveable relative to the longitudinally extensive handle; a means for selectively locking the actuating handle to the longitudinally extensive handle and preventing motion therebetween; and first and second linking rods. The first linking rod extends between the first filter plate and the actuating handle and the second linking rod extends between the second filter plate and the actuating handle. The first and second linking rods transmit motion of the actuating handle relative to the longitudinally extensive handle to the first and second filter plates and cause the first and second filter plates to move relative to the longitudinally extensive handle.

OBJECTS OF THE INVENTION

Exemplary embodiments of the present invention solve inadequacies of the prior art by providing a commercial grill, restaurant hood or similar baffle filter installation and removal tool that permits the grill filter to be safely and reliably removed and installed while still remaining standing on the floor. A lock is provided to ensure that the tool holds the filter, until intentionally released, to further reduce the chances of an accidental drop.

A first object of the invention is to facilitate manual installation and removal of a vent baffle. A second object of the invention is to provide a manual installation and removal tool that is both intuitive and safe to manually operate. Another object of the present invention is to provide a locking mechanism to ensure that the tool remains securely coupled to a vent baffle or filter, even without a person grasping the tool. A further object of the invention is the provision of a generally symmetrical tool that is functional with a wide variety of baffles or filters, thereby reducing the number of unique parts required and associated manufacturing expense. Yet another object of the present invention is to provide a light-weight and yet durable tool that may readily be used by many diverse people, while still retaining sufficient size and reach to permit use in a variety of diverse installations or work areas.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment baffle tool 1, the present invention provides a commercial grill or vent hood baffle filter installation and removal tool that permits a baffle or filter to be safely and reliably removed and installed by a person who may remain standing on the floor in front of the grill.

Figure 1:
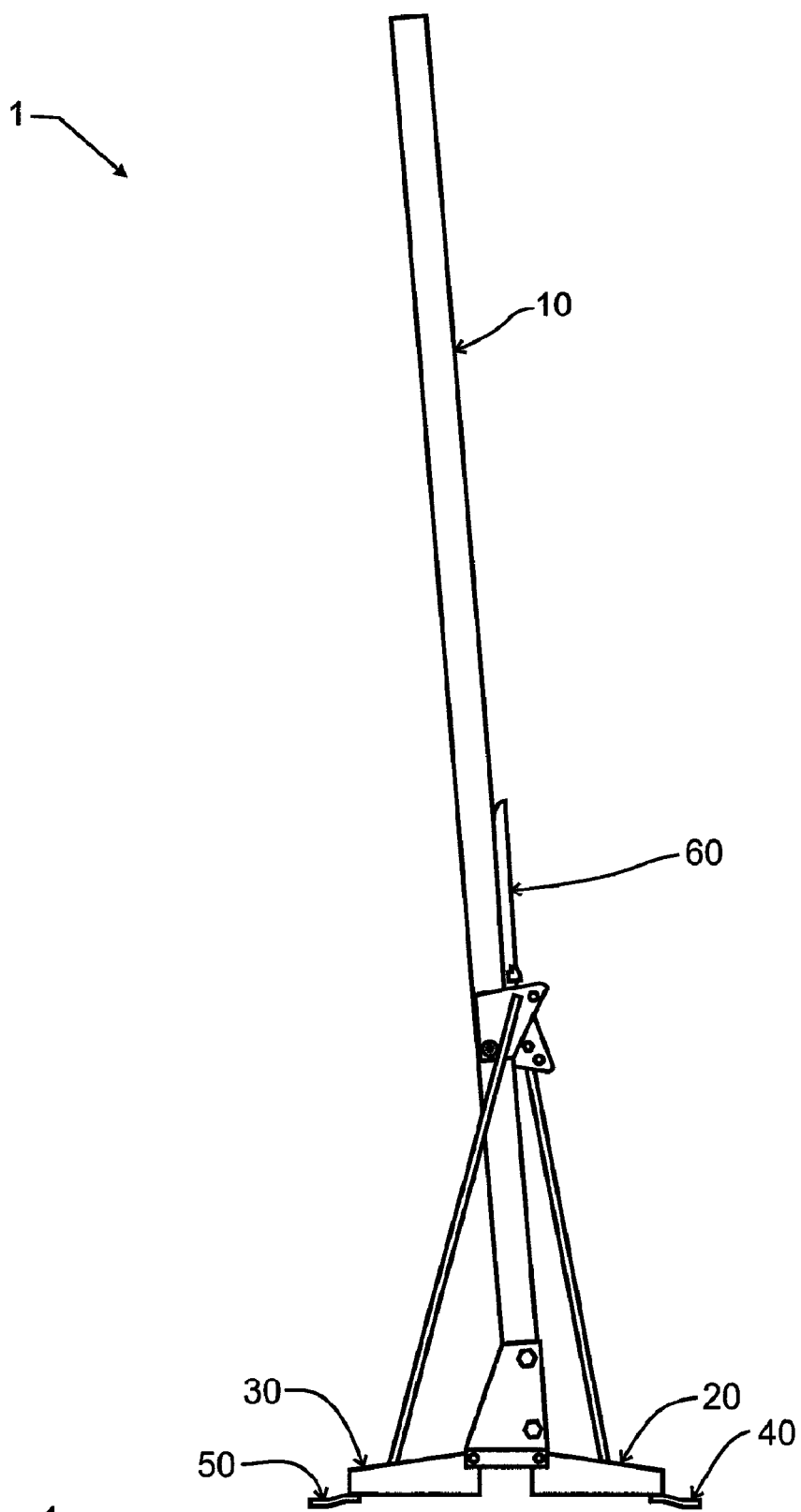
FIG. 1 illustrates a preferred embodiment baffle tool designed in accord with the teachings of the invention from side plan view.

In a most preferred embodiment of the invention illustrated in FIG. 1, baffle tool 1 is comprised of a handle 10, locking mechanism 60, filter plates 20, 30, and prongs 40, 50. Handle 10 is cylindrical in the preferred embodiment, though any suitable geometry and cross-section may be used.

Figure 2:
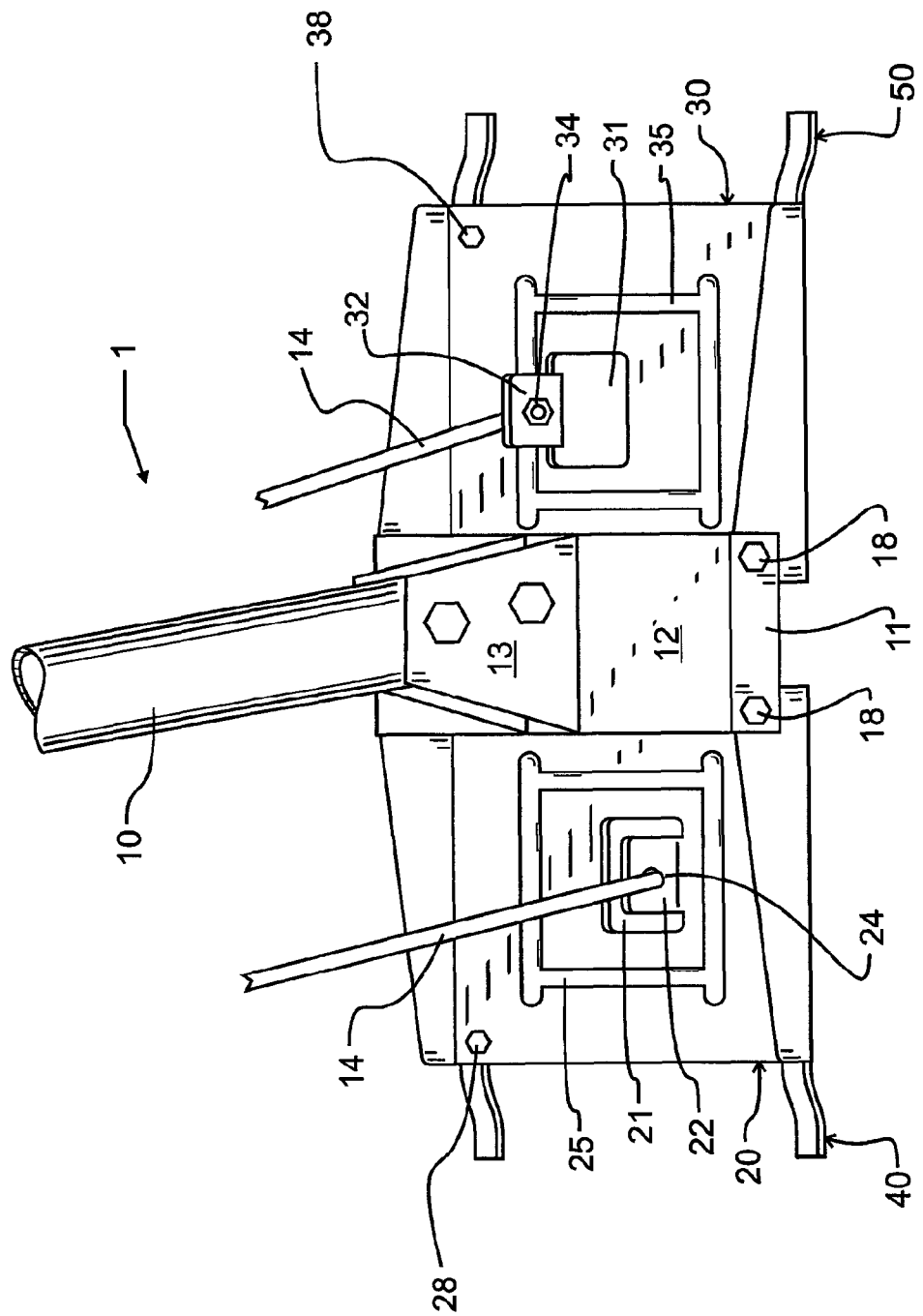
FIG. 2 illustrates the filter end of the preferred embodiment baffle tool of FIG. 1 from a slightly projected and enlarged, or close-up, generally top view, at a perspective somewhat closer than that of FIG. 1.

As visible in FIG. 2, handle 10 is rigidly affixed at an angle to base plates 12. In this preferred embodiment, base plates 12 are provided with a triangular portion 13 extending longitudinally with and adjacent to handle 10, allowing bolt-on attachment of handle 10. The provision of triangular portion 13 facilitates ready removal and replacement of handle 10, but any suitable means of connection is contemplated herein.

An additional tab 11 extends down on the side distal to handle 10 for connection to filter plates 20, 30. Base plates 12 most preferably extend generally symmetrically to each other from and about handle 10. In the preferred embodiment, base plates 12 are most preferably pivotally attached at tab 11 to filter plates 20, 30, using a locking pin, rivet, screw, shoulder bolt or other similar pivotal fastener 18 known to one in the art of rotational attachment or couplers.

Filter plates 20, 30 have tabs 22, 32 cut out of each base which fold toward handle 10, leaving behind holes 21, 31. Most preferably, tabs 22, 32 function as anchor points for linking rods 14, which extend between filter plates 20, 30 and locking mechanism 60. Linking rods 14 most preferably are anchored to filter plates 20, 30 by passing through a hole 24, 34 in tabs 22, 32, wherein they may be retained using combinations of pins and washers, clips or other suitable couplings 34 such as have already been described elsewhere in this application or known to those in the art of fasteners or couplers. Prongs 40, 50 are attached to the underside of filter plates 20, 30 using screws or other suitable fasteners 28, 38. While plates 20, 30 and prongs 40, 50 are preferably attached using removable fasteners, so that they may be removed or replaced at will, this is a matter of design choice, and so they may alternatively be permanently affixed if so desired.

Preferred embodiment plates 20, 30 are fabricated from sheet metal stock. In order to reduce the required thickness of the plates and resultant weight of baffle tool 1, reinforcing ridges 25, 35 are preferably formed in plates 20, 30, respectively, such as by stamping to deform the plates in the region identified by the ridges. As will be appreciated, other techniques or materials may be used to achieve suitable strength and rigidity.

Figure 3:
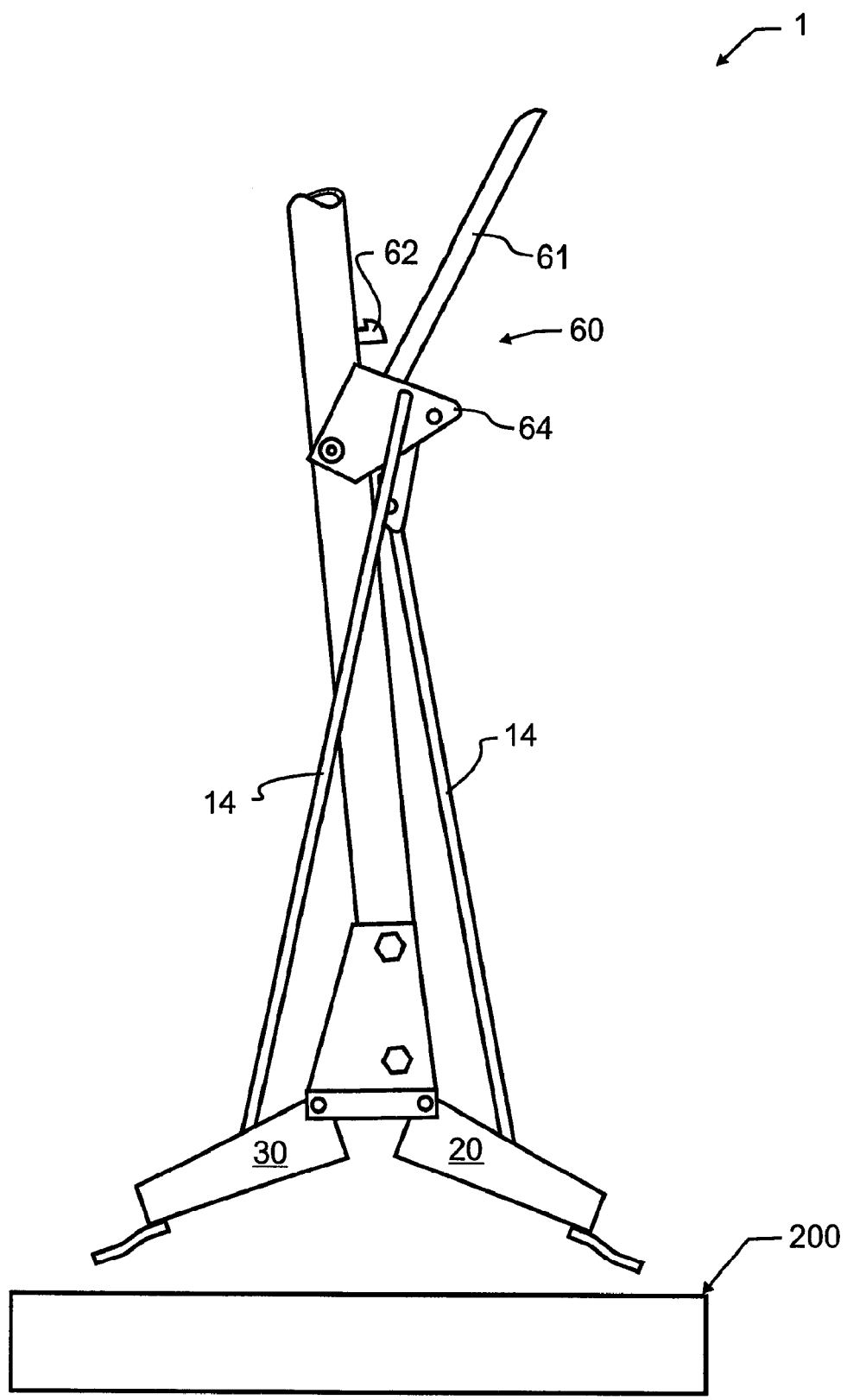
FIG. 3 illustrates the preferred embodiment baffle tool of FIG. 1 from side plan view in further combination with a filter, with the preferred embodiment baffle tool opened to a release position just prior to or subsequent to grasping the filter.
Figure 4A:
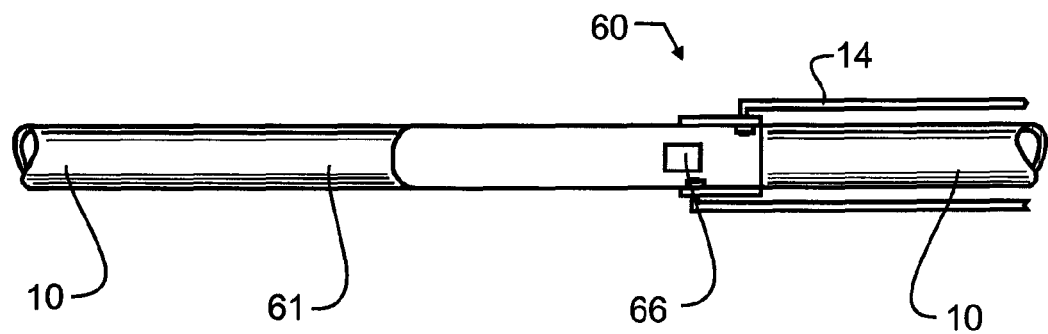
FIGS. 4*a* and 4*b* illustrate the preferred embodiment locking mechanism of the preferred embodiment tool in an open position from top and side views, respectively.
Figure 4B:
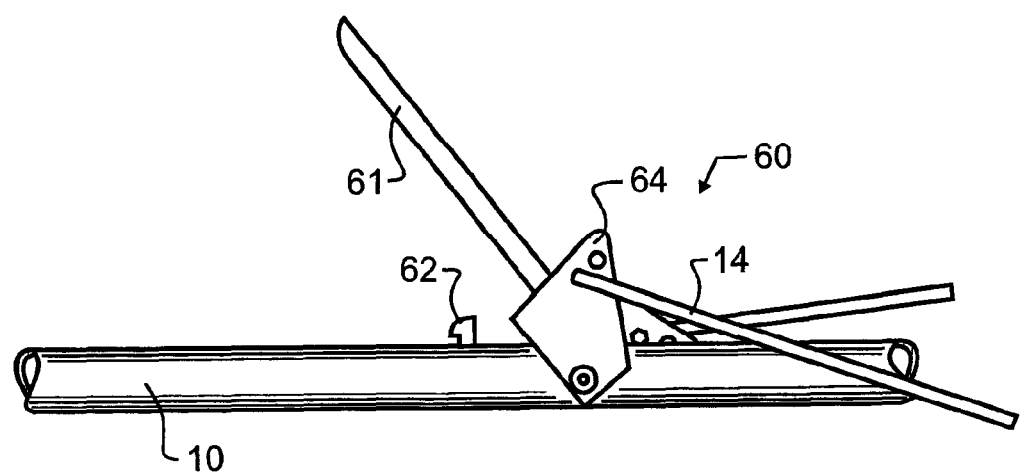
Figure 5A:
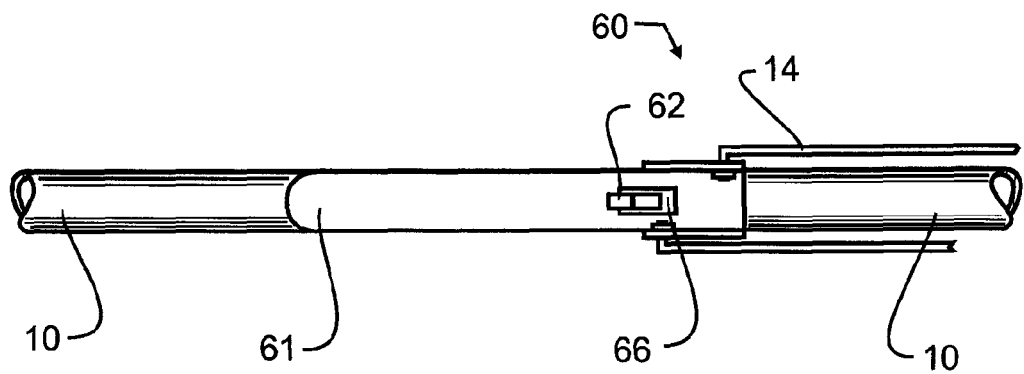
FIGS. 5*a* and 5*b* illustrate the preferred embodiment locking mechanism of the preferred embodiment tool in a locked position from top and side views, respectively.
Figure 5B:
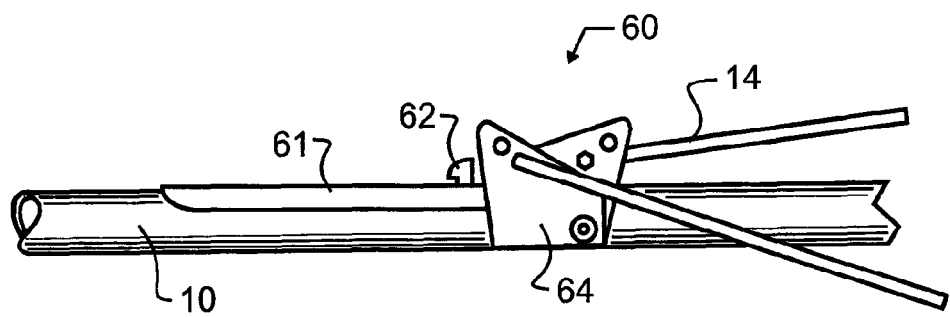

As can be seen in FIG. 3, when locking mechanism 60 is opened by pivoting locking handle 61 away from handle 10, filter plates 20, 30 have an approximately 120 degree angle between them. As the locking mechanism 60 is moved into the closed, locked position as illustrated in FIG. 1, filter plates 20, 30 extend into a co-planar or 180 degree position. This process allows the prongs 40, 50 to engage with filter 200 in such a manner that filter 200 may be readily grasped and removed. In use, locking mechanism 60 is first opened as illustrated in FIG. 3, and tool 1 is engaged with filter 200. As tool 1 is pressed against the filter surface, filter plates 20, 30 will move to the position of FIG. 1, and locking mechanism 60 may then be locked to the position of FIG. 1 by pivoting locking handle 61 towards handle 10. Due to locking mechanism 60, preferred embodiment baffle tool 1 will remain engaged with filter 200 until the user desires to release locking mechanism 60. This reduces the risk of accidental damage to filter 200, and also permits easier manipulation, since the user may focus on holding and manipulating filter 200 without worrying about also ensuring positive engagement between tool 1 and filter 200.

FIGS. 4a-5b illustrate the operation and features of locking mechanism 60 in more detail. In the most preferred embodiment of the invention, locking mechanism 60 is located within easy reach of the proximal end of handle 10. For the purposes of this disclosure, the proximal end of handle 10 is to be understood as the end farthest from filter plates 20, 30, most proximal to a user's likely holding position. Preferred embodiment locking mechanism 60 is comprised of locking handle 61, linking rods 14, pivoting latch 64 fixedly attached to locking handle 61, and locking catch 62. As can be seen particularly from FIG. 4b, linking rods 14 attach to pivoting latch 64 in such a manner that as pivoting latch 64 pivots between open and closed position, the motion is carried through to filter plates 20, 30. The motion of closing pivoting latch 64 and locking handle 61, which is illustrated in the change from the unlatched or open position shown in FIGS. 4a and 4b to the latched or closed position shown in FIGS. 5a and 5b, most preferably causes filter plates 20, 30 to pivot until they are co-planar such as shown in FIG. 1. Additionally, when in a closed position shown in FIGS. 5a and 5b, pivoting latch 64 adjacent to locking handle 61 most preferably engages with catch 62. In the preferred embodiment of the invention, pivoting latch 64 has a slot 66 through which catch 62 passes, before engaging with pivoting latch 64. Catch 62 is preferably designed in such a manner, such as through appropriate spring loading, to allow pivoting latch 64 to slide into place against handle 10, at which point catch 62 physically holds pivoting latch 64 in place until manually released. This type of catch is known in the coupling and fastening arts, and it will be appreciated that other known catches that provide similar or suitable operation will be understood to be incorporated herein as suitable alternatives.

Figure 6:
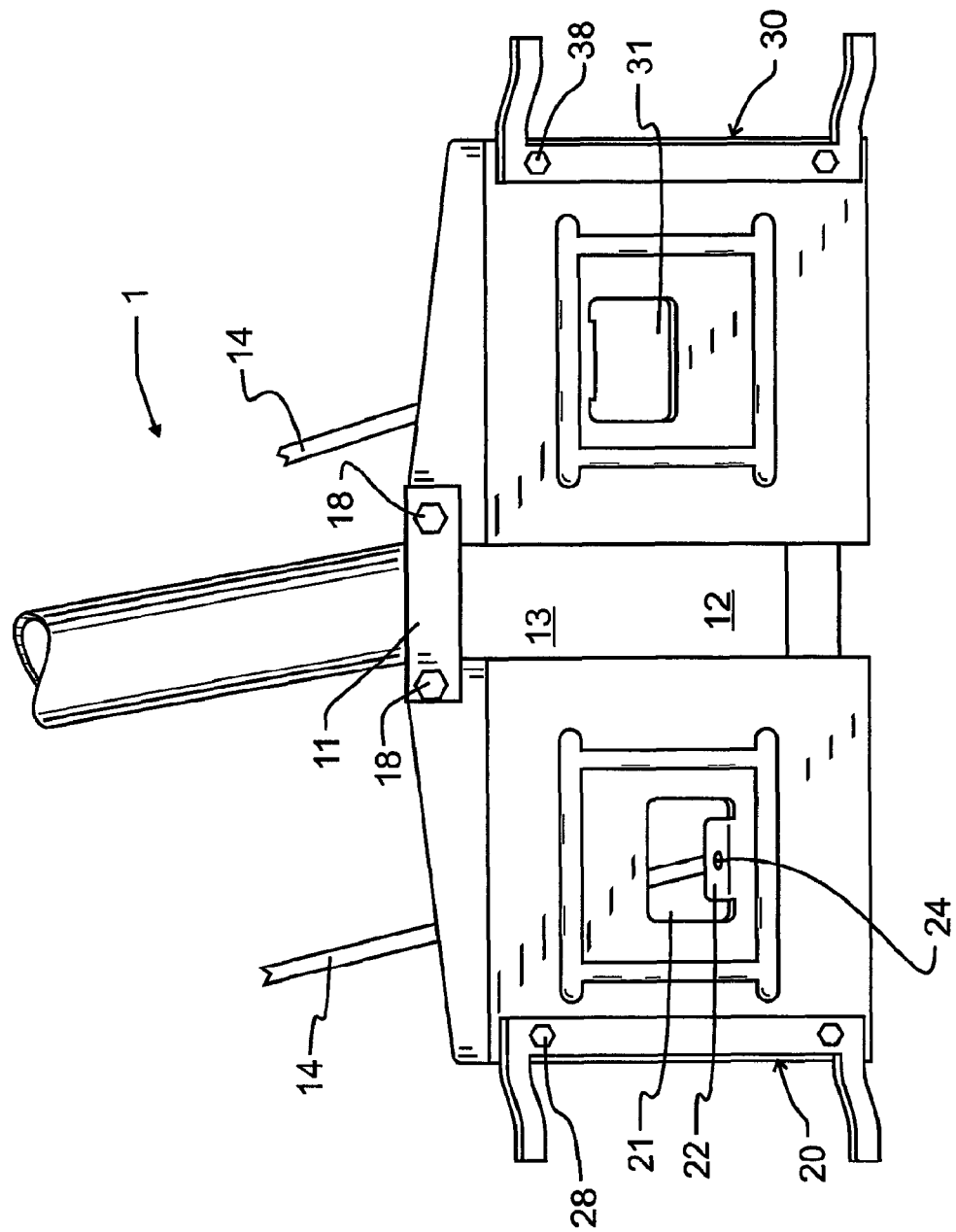
FIG. 6 illustrates the preferred embodiment filter end in a locked position from a bottom slightly projected view.

FIG. 6, which illustrates baffle tool 1 form a bottom and slightly projected view, provides a better view of prongs 40, 50. In the preferred embodiment, prongs 40, 50 are solid C-shaped plates which extend from plates 20, 30. As a result of having multiple tips, filter 200 may be held more stable, with reduced force on any specific part of the filter. As can be seen, prongs 40, 50 are removable and replaceable by provision of holes through which fasteners 28, 38 may pass. In such a manner, if prongs 40, 50 are damaged in use or storage, they can be readily replaced. Additionally, different styles of prongs 40, 50 may be needed in some instances to connect with the various commercially available filters, so having removable and replaceable prongs 40, 50 allows for more versatility. It is noteworthy here that the preferred embodiment prongs 40, 50 hold a filter 200 at four points, which provides a very stable and secure connection to the filter.

Figure 7:
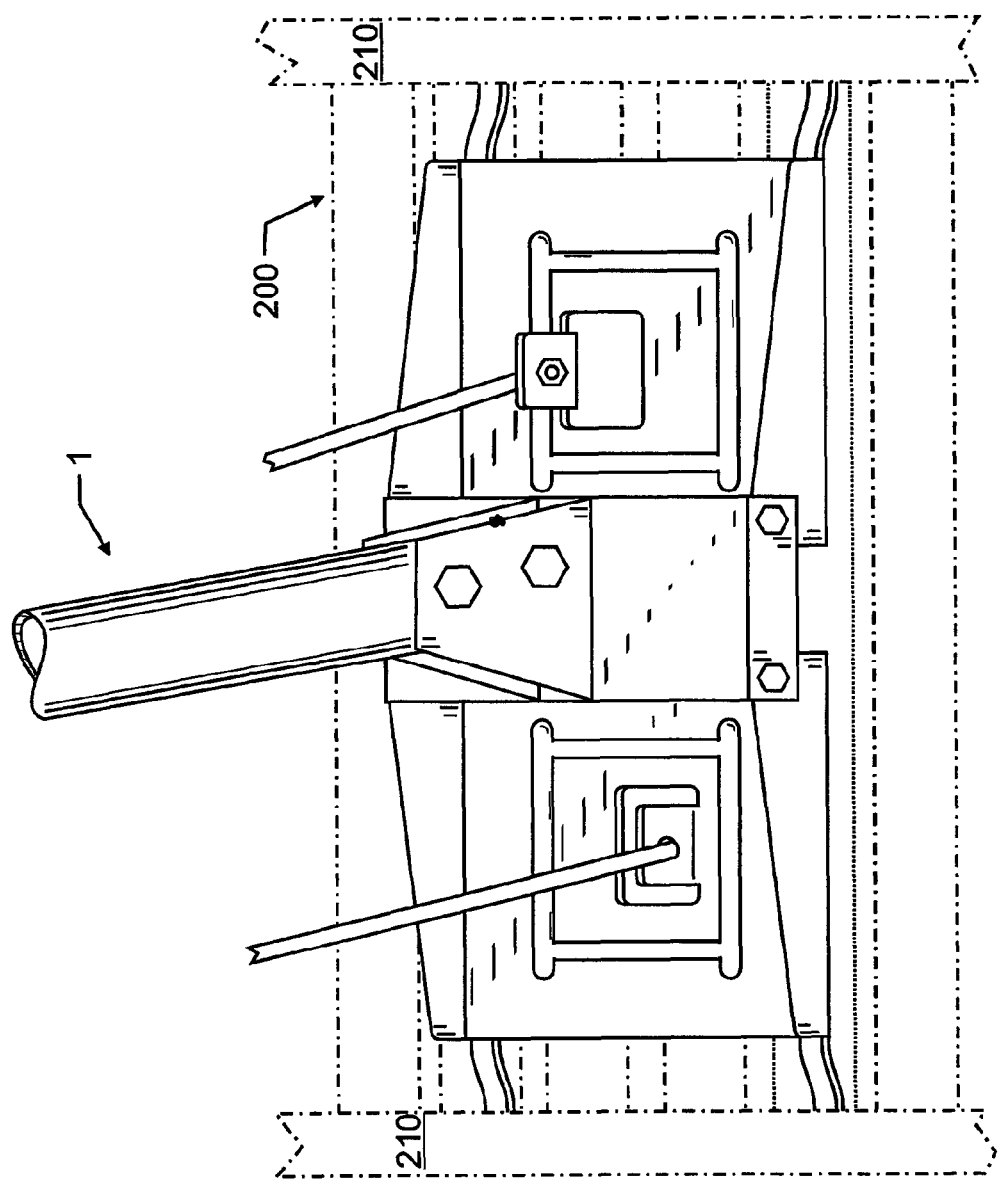
FIG. 7 illustrates the preferred embodiment baffle tool of FIG. 1 in combination with a filter from a top and slightly projected view.

FIG. 7 illustrates preferred embodiment baffle tool 1 in combination with a filter 200. As can be seen in these figures, prongs 40, 50 lock in place under frame 210 of filter 200, allowing for the removal and maneuvering of filter 200 from a vent.

From these figures and description, several additional features and options become more apparent. First of all, baffle tool 1 may be manufactured from a variety of materials, including metals, resins and plastics, ceramics or cementitious materials, or even composites, laminates or other combinations of the above or other suitable materials. The specific material used may vary, though special benefits are attainable if several important factors are taken into consideration. Firstly, baffle tool 1 will preferably be sufficiently light to enable even a relatively frail individual to maneuver the baffle tool 1 into place with filter 200 as well as the combination of the baffle tool 1 and filter 200 safely to a surface. For lighter materials, this is of less consequence, but the difficulty holding and adjusting baffle tool 1 increases greatly with denser, heavier materials. Most preferably, baffle tool 1 will also be corrosion resistant, temperature resistant, and sufficiently durable to withstand the forces found in the intended application, including any forces or temperatures that may be applied that could tend to bend or disfigure prongs 40, 50. Additionally, resistance to abrasion or fracture that could otherwise occur from dropping or contact with other objects during handling and storage may be beneficial, and heat resistance to endure accidental or momentary contact with a hot surface may also be beneficial.

Handle 10 may optionally be extendable, which permits the center of gravity to be lowered when trying to reach shorter distances, while handle 10 could still be extended to reach greater distances where necessary.

The actual engagement between prongs 40, 50 and a filter 200 is, as already noted, dependent somewhat upon the materials and application. The most preferred materials for prongs 40, 50 are metals, which may or may not include various alloys, characteristic-altering fibers or particles, and other ingredients known to enhance the properties of the composition and resulting product. Where metals are used and a tighter fit is desired between prongs 40, 50 and a filter 200, additional features may be provided to either prongs 40, 50 or filter 200 to ensure tight engagement. These additional features may include interlocking tapers, textured or special composition grips, or other such features as may be known in the art of coupling and which may be desired herein. For nearly all applications, however, there will not be a need for tighter coupling than would be achievable from ordinary production tolerances and material compliance.

While filter plates 20, 30 are designed to pivot relative to handle 10 and thereby increase or decrease extension in a direction transverse to handle 10, it will further be appreciated that other mechanism are contemplated herein for effecting this transverse change. For exemplary purposes only, and not limiting thereto, filter plates 20, 30 might be actuated to move towards each other or away therefrom, rather than or in addition to pivoting, either which would still preferably vary the transverse extension of these filter plates. The preferred embodiment is designed to pivot, both for ease of fabrication and also because of the natural ease of insertion into filter 200 that is achieved therefrom.

In the preferred embodiment, wherever reasonably possible, like parts are dimensioned to be identical. So, for exemplary purposes, both linking rods 14 are preferably of identical dimension. Similarly, filter plates 20 and 30 may be manufactured identically. The symmetry found in the present invention permits the stocking of fewer parts and higher volumes of production per individual part, both which are beneficial to the overall cost of fabrication of the present invention.

While the foregoing details what is felt to be the preferred embodiment of the invention, no material limitations to the scope of the claimed invention are intended. Further, features and design alternatives that would be obvious to one of ordinary skill in the art are considered to be incorporated herein.

The scope of the invention is set forth and particularly described in the claims herein below.

I claim:

1. A baffle tool that permits a baffle, such as may be used to filter an airstream passing through a hood, to be safely and reliably manually removed and installed by a person who may remain standing on the floor, comprising:
    a longitudinally extensive handle;
    a pair of filter plates, each of said pair of filter plates pivotal with respect to each other of said filter plates and to said handle;
    filter-engaging prongs protruding from said filter plates distal to said handle;
    an actuator moveable with respect to said handle; and
    a pair of rods linking said actuator to said filter plates;
    a first quadrilateral linkage defined on a first side by a first one of said pair of rods, on a second side by a first one of said pair of filter plates, on a third side by said longitudinally extensive handle, and on a fourth side by actuator;
    a second quadrilateral linkage defined on a first side by a second one of said pair of rods, on a second side by a second one of said pair of filter plates, on a third side by said longitudinally extensive handle, and on a fourth side by actuator, said first side and said third side crossing each other; such that movement of said actuator effects pivotal movement of said filter plates relative to said handle.

2. The baffle tool of claim 1, further comprising a pivotal locking catch protruding from said longitudinally extensive handle, said pivotal locking catch manipulable for selectively locking said actuating handle to said longitudinally extensive handle and preventing motion therebetween.

3. The baffle tool of claim 2, wherein said pivotal locking catch further comprises a manually actuated lock pivotal and spring loaded to translate within a slot in said actuator in a first direction when said actuator approaches said longitudinally extensive handle and to translate in a second direction opposed to said first direction and capture said actuator between said pivotal locking catch and said longitudinally extensive handle, securing said actuator against movement relative to said handle.

4. The baffle tool of claim 1, wherein said pair of rods linking said actuator to said filter plates transmit motion of said actuator relative to said longitudinally extensive handle to said pair of filter plates relative to said longitudinally extensive handle, said filter plates longitudinally parallel when said actuator is parallel with said longitudinally extensive handle and angularly offset when said actuator is angularly offset from said longitudinally extensive handle.

5. The baffle tool of claim 4, wherein a pivot of said actuator from an unlatched position to a latched position causes said pair of filter plates to pivot from a non-parallel orientation until they are parallel when said pivoting latch is in said latched position.

6. In combination, a filter suitable for use with a grill vent and a longitudinally extensive and transversely collapsible filter baffle tool operatively engaging with said filter,
    said filter having:
        a plurality of baffles separated by empty spaces therebetween; and
        a frame retaining said baffles at distal ends;
    said longitudinally extensive and transversely collapsible filter baffle tool having:
        a longitudinally extensive handle;
        first and second filter plates, each of said filter plates pivotal with respect to said handle;
        filter-engaging prongs protruding from said filter plates distal to said handle and operatively engaging with said filter;
        an actuator moveable with respect to said handle; and
        first and second rods linking said actuator to said filter plates such that movement of said actuator effects pivotal movement of said filter plates relative to said handle;
        a pivoting latch fixedly attached to said actuator;
        a locking catch engaged with said longitudinally extensive handle and manipulable between engaging with said pivoting latch and thereby preventing motion of said actuator relative to said longitudinally extensive handle and disengaged from said pivoting latch and thereby allowing motion of said actuator relative to said longitudinally extensive handle.

7. The combination filter and baffle tool of claim 6, further comprising a first quadrilateral linkage defined on a first side by said first rod, on a second side by said first filter plate, on a third side by said longitudinally extensive handle, and on a fourth side by said actuator; and
    a second quadrilateral linkage defined on a first side by a second one of said pair of rods, on a second side by a second one of said pair of filter plates, on a third side by said longitudinally extensive handle, and on a fourth side by said actuator, said first side and said third side crossing each other, such that movement of said actuator effects pivotal movement of said filter plates relative to said handle.

8. The combination filter and baffle tool of claim 6, wherein a pivot of said pivoting latch from an unlatched position to a latched position engaged with said locking catch causes said pair of filter plates to pivot from a non-parallel orientation until they are parallel when said pivoting latch is in said latched position.

9. A commercial grill filter installation and removal tool, comprising:
    a longitudinally extensive handle;
    first and second filter plates movably attached to said handle and operative to couple with said commercial grill filter;
    an actuating handle pivotal relative to said longitudinally extensive handle;
    a means for selectively locking said actuating handle to said longitudinally extensive handle and preventing motion therebetween when said actuating handle is parallel with said longitudinally extensive handle;
    first and second linking rods, said first linking rod which couples between said first filter plate and said actuating handle and said second linking rod which couples between said second filter plate and said actuating handle, said first and second linking rods transmitting motion of said actuating handle relative to said longitudinally extensive handle to said first and second filter plates and causing said first and second filter plates to rotate in opposite directions relative to said longitudinally extensive handle, said first and second filter plates parallel with each other and securely coupled to said commercial grill filter when said locking means locks said actuating handle to said longitudinally extensive handle and otherwise angularly offset from each other and uncoupled from said commercial grill filter.

10. The commercial grill filter installation and removal tool of claim 9, further comprising:
    a first quadrilateral linkage defined on a first side by said first linking rod, on a second side by said first filter plate, on a third side by said longitudinally extensive handle, and on a fourth side by said actuating handle; and a second quadrilateral linkage defined on a first side by said second linking rod, on a second side by said second filter plate, on a third side by said longitudinally extensive handle, and on a fourth side by said actuating handle, said first side and said third side crossing each other, such that movement of said actuator effects pivotal movement of said filter plates relative to said handle.

11. The commercial grill filter installation and removal tool of claim 9, wherein said means for selectively locking further comprises a manually actuated lock securing said actuating handle against movement relative to said longitudinally extensive handle.

12. The commercial grill filter installation and removal tool of claim 11, wherein said manually actuated lock further comprises:
 a locking handle;
 a pivoting latch fixedly attached to said locking handle; and
 a locking catch engaged with said longitudinally extensive handle and manipulable between engaged with said pivoting latch and thereby preventing motion of said actuator relative to said longitudinally extensive handle and disengaged from said pivoting latch and thereby allowing motion of said actuator relative to said longitudinally extensive handle;
 said linking rods attached to said pivoting latch such that as said pivoting latch pivots between open and closed position, said pivotal motion is carried through to said filter plates.

13. The commercial grill filter installation and removal tool of claim 12, wherein said pivoting latch further comprises a slot through which said locking catch passes before engaging with said pivoting latch.

* * * * *